United States Patent [19]
Seguin

[11] Patent Number: 5,863,591
[45] Date of Patent: Jan. 26, 1999

[54] PROCESS TO SHORTEN THE COOKING TIME OF DRIED LEGUME BEANS

[75] Inventor: James J. Seguin, 615 Vistamont Ave., Berkeley, Calif. 94708

[73] Assignee: James J. Seguin, Berkeley, Calif.

[21] Appl. No.: 585,766

[22] Filed: Jan. 16, 1996

[51] Int. Cl.⁶ .................................................. A23L 1/201
[52] U.S. Cl. .......................................... 426/634; 426/507
[58] Field of Search ..................... 426/634, 629, 426/507, 508

[56] References Cited

U.S. PATENT DOCUMENTS

| | | | |
|---|---|---|---|
| 3,739,713 | 6/1973 | Kudale et al. | 99/487 |
| 4,079,155 | 3/1978 | Kakade | 426/634 |
| 4,256,775 | 3/1981 | Kunz | 426/508 |
| 4,510,164 | 4/1985 | Staley et al. | 426/629 |
| 5,213,831 | 5/1993 | Leggott et al. | 99/357 |

*Primary Examiner*—Anthony J. Weier

[57] ABSTRACT

A process to shorten the cooking time of dried legume beans by subjecting the beans to a short-timed, high-pressure, hydration. Significantly reduced cooking time follows, or cooking can be postponed for several months by storage in a refrigerator or more than several months in a freezer with no increase in cooking time for table-readiness and no degradation of quality. Also, the process diminishes the discomforts of flatulence.

1 Claim, 5 Drawing Sheets

PROCESS TO SHORTEN THE COOKING TIME OF DRIED LEGUME BEANS

BACKGROUND

1. Field of Invention

This invention is a process to shorten substantially the cooking time of dried legume beans.

2. Description of Prior Art

The seasonal production of agricultural staples is usually larger than the immediate consumer demand; therefore, food processors dry a a large portion of crop surpluses in order to provide a year-round supply and to minimize spoilage. Fresh vegetables take little time to cook; dried beans, especially, require much longer preparation.

I visited several large food supermarkets to compare the cooking instructions printed on packages of dried beans. An assortment of beans sold under national brand names and house brands in Safeway, Lucky, Raley, and Andronico stores indicated very similar preparation instructions: Great Northern, Small White, Pinto beans and lentils require overnight soaking or 6 to 8 hours of soaking before cooking for 1 to 1½ hours. Dried Navy beans need 3 hours of cooking after overnight soaking. Dried Lima beans require the least preparation time: "bring to a boil for three minutes, let stand for one hour, then simmer for 1 to 1½ hours." Dried beans are inexpensive; the median price per pound is 65 cents and 50 cents for bulk beans sold from an open barrel. Unfortunately, the demand for these inexpensive, wholesome foods is lukewarm; only a small percentage of consumers buy unprepared dried beans because of the advance planning required to cook them for a meal. In addition, some varieties of dried beans cooked in this manner give rise to digestive system discomforts in the form of flatulence.

Unseasoned canned beans are convenient to use. The contents can be heated for a supplement to a meal or the liquids can be drained from the can to prepare a cold salad. In any case, the cook has little control in cooking to taste; it is the cannery which has determined how well done the contents are. Canned beans are more expensive: a one pound can of Lima beans costs $1.65; Garbanzo, Kidney, and Pinto beans, 77 cents. The cost per pound is further increased because the liquid in the can, at least one-fourth of the volume, is discarded. Thus the per pound price of the canned Lima beans becomes $2.20 and that of the Garbanzo, Kidney, and Pinto beans $1.02.

The frozen food section of the above-named stores offers only two choices of dried beans which are partly precooked before freezing: Lima beans requiring 10–15 minutes of cooking and 30 minutes for Blackeye peas but the quality of these two convenience products suffers: they acquire a mushy consistency when fully cooked. Because of increased processing, these handy products are expensive: frozen Lima beans and Blackeye peas are priced at $2.23 per pound.

A small assortment of precooked dried beans in powder form is available at health food stores and some supermarkets. Instructions on the packages call for adding a specified quantity of water, mixing thoroughly, stirring, and allowing the mixture to stand for 10 minutes. Cooking requires only an additional 10 to 12 minutes. These products are tasty and easily prepared but have the consistency of mashed potatoes. Such highly processed convenience food is very expensively priced: $4.23 per pound.

The use of a pressure cooker is an expedient method of reducing the combined preparation and cooking time of dried beans. Dispensing with overnight or prior soaking and using 15 lbs of steam pressure, Garbanzo beans require 80 minutes; Great Northerns need 50 minutes; Pintos and small Limas, 45; and split peas only 15 minutes. The use of pressure cookers does eliminate prior soaking and shortens cooking time. However, once popular pressure cookers have now fallen out of favor as a time-saving cooking utensil due to the inability of the appliance to deliver consistently acceptable results. Often the cooker delivers surprisingly undercooked or overcooked results. This is due to variations in those factors which have a direct influence on the cooking time of dried beans: geographical origin, age, degree of dryness, and the type of water used. In addition, there can be mechanical problems with the cooker: gaskets may not seat properly., causing pressure leaks, and pressure gauges sometimes fail due to clogging.

SUMMARY OF THE INVENTION

My invention replaces the necessary lengthy prior soaking of dried beans with a brief high-pressure hydration. Much water or water-based liquid is forced into each bean. Changes in pressure and hydration time are inversely related to each other: an increase in pressure results in a decrease in hydration time, and vice versa, but within narrow limits. The optimum combination of hydration time and amount of pressure is selected in order to provide the shortest cooking time. For example, Pinto beans will cook in 10 minutes when hydrated for 15 minutes at 1,100 lbs. of pressure.

Other varieties of dried beans require different selections of the above variables in order to obtain the shortest cooking time. After hydration, the beans are drained and can then be:

1) cooked in much shorter time for immediate table use,
2) stored for several months in a refrigerator with no required increase in cooking time and no degradation of quality,
3) stored for longer periods of time in a freezer. Accordingly, several objects and advantages of my invention are:

a) Affords the use of inexpensive dried legume beans,
b) Eliminates prior soaking,
c) Provides a very short cooking time ranging from 10 to 30 minutes depending on the variety of dried beans,
d) Permits the cook to make small adjustments in cooking time due to origin of the beans, age, dryness, and water quality,
e) Allows the cook to select personal degree of table-readiness from al dente to well done,
f) Provides a simple, relatively low-cost dried bean food process,
g) Eliminates much of the digestive system discomforts from flatulence.

BRIEF DESCRIPTION OF THE DRAWING

The file of this patent application contains at least one drawing executed in color. Copies of this patent with color drawings in triplicate will be provided by the Patent and Trademark Office upon request.

DETAILED DESCRIPTION

Figure 1:
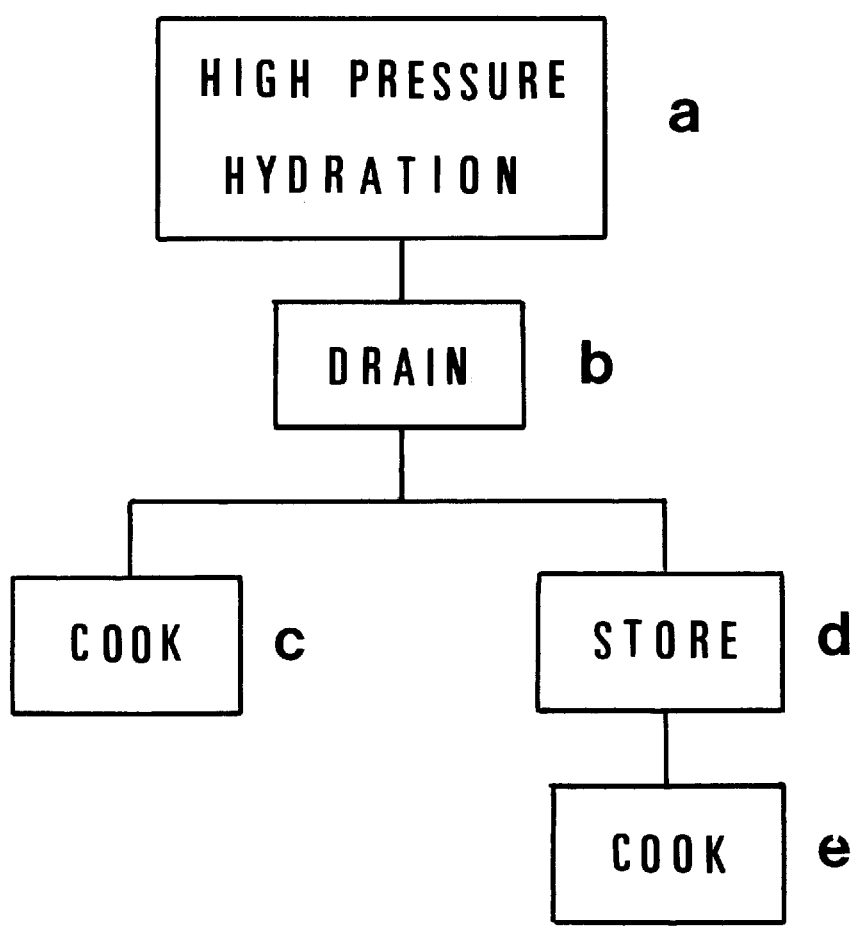
FIG. 1 is a flow chart representation of the process in accordance with the present invention.
Figure 2:
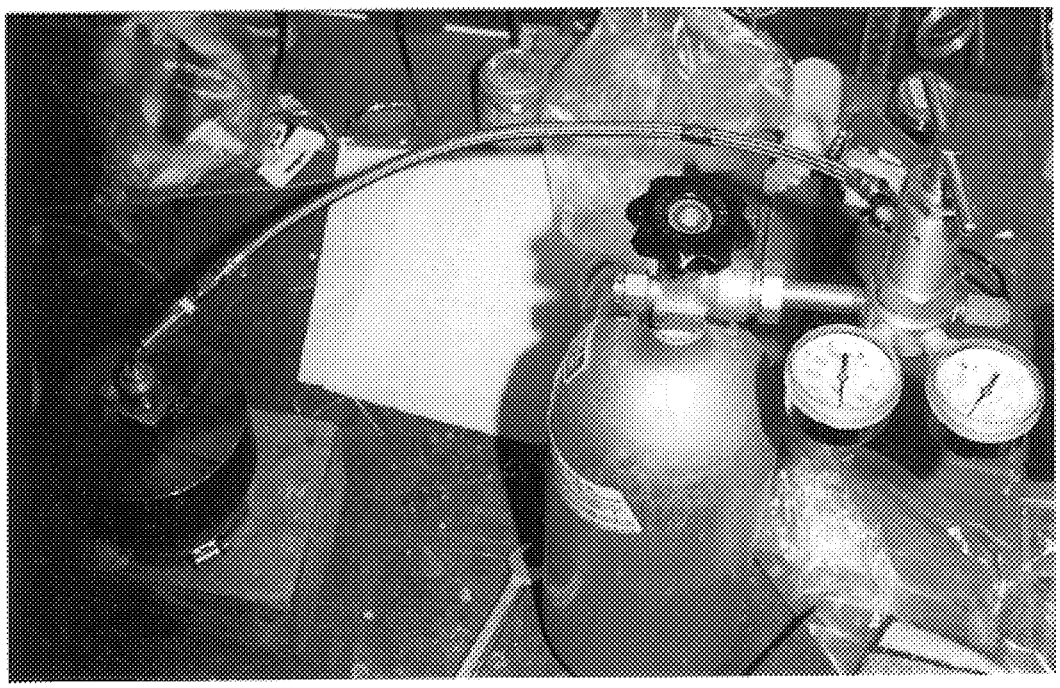
FIG. 2 depicts the apparatus used in the instant invention registering 1000 lbs. of pressure on the canister gauge.
Figure 3:
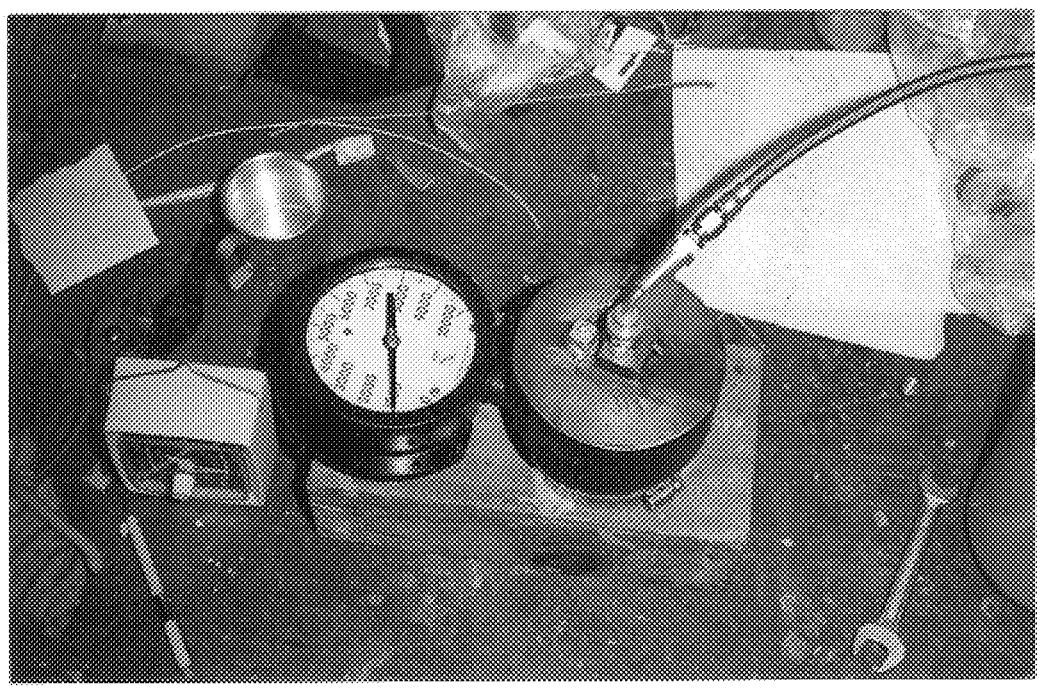
FIG. 3 depicts the apparatus used in the instant invention which also shows a registering of 1000 lbs. of pressure on the canister gauge.
Figure 4:
FIG. 4 depicts a comparison between an unprocessed dried bean and a hydrated bean showing the sizeable increase in volume.

The following flow chart labeled FIG. 1 depicts the complete process to shorten substantially the cooking time of dried beans.

10—The dried beans are subjected to a short-time period of water or water-based mixture at high pressure to force liquid into the beans. This is called high-pressure hydration.

12—Excess surface liquid is drained from the beans.

14—The hydrated beans can be stored for future cooking. Storage can be in a refrigerator or a freezer, depending on the length of storage.

16—A short cooking time is the next and final step in meal preparation.

The process and method described above is the sole object of my patent application. To strengthen the validity of my application, I will describe below the apparatus used in my experiments. High pressure can be contained in a leak-resistant container by the use of several methods: mechanical, hydraulic, and gas pressure. Each has different degrees of economy and efficiency depending on the size of the apparatus. The high-pressure resistant canister I invented and used for my experiments generated pressure by driving a large diameter bolt into the canister. As the bolt was torqued, the dead space in the canister was eliminated. Additional turning then forced water into each dried bean. Although the early results were encouraging, I modified the design of the apparatus to enable me to use outside gas pressure. Now results are obtained faster and with more selective control of inside pressure.

Figure 5:
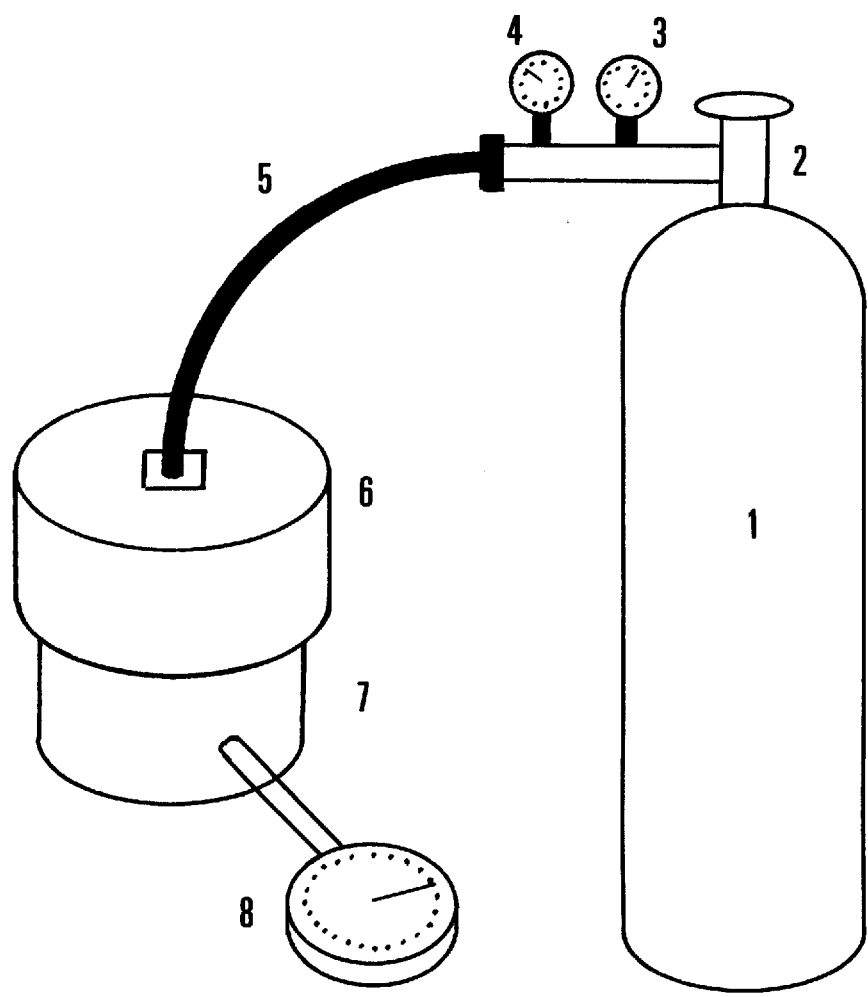
FIG. 5 is a drawing of the operating parts of the apparatus.

The apparatus used to achieve the method of the instant invention is depicted in FIG. 5 and comprises a compressed gas cylinder (1) with a valve (2) and a canister body (7) wherein a tube (5), cylinder pressure gauge (3), and exit pressure gauge (4) exist between said gas cylinder (1) and canister body (7), said tube (5) being connected to said canister body via a canister lid (6) and said canister body having connected therein an inboard pressure gauge (8).

Currently, unprocessed dried beans are usually prepared for table-readiness by several hours of soaking followed by lengthy cooking time. The object of this invention is to replace the preliminary soaking with a high-pressure hydration of water or water-based liquid. Hydration time is short in comparison to the current practice of preliminary soaking and varies inversely with pressure. Other factors also affect bean hydration time slightly: variations in fiber consistency owing to different varieties of beans, origin, age of beans, and possibly water quality. Because of high pressure hydration, cooking time is much reduced. For example, Pinto beans need only 10 minutes of cooking time in comparison to 60 minutes required for the current conventional method of preparation. An additional advantage of the high-pressure process for hydrating beans is that once hydrated, beans can be stored in a refrigerator or freezer for long periods of time with no degradation of quality and no additional cooking time requirement. A restaurant or household cook will have the ability to prepare a bean dish quickly, thereby eliminating one obstacle responsible for the low volume of bean consumption. Also, many people who know the nutritious value of beans avoid eating them because the traditional cooking methods create flatulence; high-pressure hydration diminishes this discomfort.

I claim:

1. A method of preparing dried legume beans for cooking consisting of the steps of:

(A) hydrating beans at a high pressure of 1,000–1,100 lbs of pressure wherein such high pressure hydrating step forces liquid into the beans and (B) subsequently draining excess liquid from the beans wherein said hydration is effected for a time sufficient for said beans to be cooked in 10–30 minutes and have a storage time of several months in a refrigerator or greater than several months in a freezer, wherein the storage in said refrigerator or freezer results in no required increase in cooking time and no degradation of quality of said beans.

\* \* \* \* \*